(12) United States Patent
Nabeiro (10) Patent No.: US 10,640,281 B2
(45) Date of Patent: May 5, 2020

(54) SUPPLY CARTRIDGE, SYSTEM OF SUPPLY CARTRIDGES AND PROCESS OF OPERATION OF A MACHINE USING SAID SYSTEM OF SUPPLY CARTRIDGES

(71) Applicant: NOVADELTA-COMERCIO E INDUSTRIA DE CAFES S.A., Lisbon (PT)

(72) Inventor: Rui Miguel Nabeiro, Campo Maior (PT)

(73) Assignee: NOVADELTA—COMÉRCIO E INDÚSTRIA DE CAFÉS S.A., Lisbon (PT)

( * ) Notice: Subject to any disclaimer, the term of this patent is extended or adjusted under 35 U.S.C. 154(b) by 350 days.

(21) Appl. No.: 15/550,104

(22) PCT Filed: Feb. 11, 2016

(86) PCT No.: PCT/PT2016/050003
§ 371 (c)(1),
(2) Date: Aug. 10, 2017

(87) PCT Pub. No.: WO2016/130034
PCT Pub. Date: Aug. 18, 2016

(65) Prior Publication Data
US 2018/0022533 A1 Jan. 25, 2018

(30) Foreign Application Priority Data
Feb. 11, 2015 (PT) .......................................... 108207

(51) Int. Cl.
*A47J 31/36* (2006.01)
*B65D 83/04* (2006.01)
*A23F 5/24* (2006.01)

(52) U.S. Cl.
CPC .......... *B65D 83/0472* (2013.01); *A23F 5/243* (2013.01); *A47J 31/3647* (2013.01);
(Continued)

(58) Field of Classification Search
CPC ................ A47J 31/3647; A47J 31/3657; A47J 31/3661; A23F 5/243; A23F 5/26; B65D 83/0472; B65D 83/0463
(Continued)

(56) References Cited

U.S. PATENT DOCUMENTS 3,181,734 A * 5/1965 Ensign .................. A47J 31/408
222/83.5
3,607,297 A * 9/1971 Fasano ................ A47J 31/3661
426/433
(Continued)

FOREIGN PATENT DOCUMENTS

| EP | 0 457 708 A1 | 11/1991 | |
| FR | 1157114 A2 * | 5/1958 | ............. A23F 5/243 |

(Continued)

OTHER PUBLICATIONS

International Search Report of PCT/PT2016/050003, dated Jun. 23, 2016. [PCT/ISA/210].
Written Opinion of PCT/PT2016/050003, dated Jun. 23, 2016. [PCT/ISA/237].

*Primary Examiner* — Reginald Alexander
(74) *Attorney, Agent, or Firm* — Sughrue Mion, PLLC (57) ABSTRACT

The present invention refers to a supply cartridge (1) comprising a package casing (11) adapted for housing a support (2) of single portions, provided as a strip-like flexible support, or similar, and presenting a plurality of single dose portions (21) of an edible substance, such as for example coffee, disposed successively along a respective longitudinal direction. In particular, the supply cartridge (1) according to the present invention comprises a package casing (11) that
(Continued)

presents an exit open adapted so that provided a more efficient and reliable displacement of said support (2) of single portions out of said package casing (11).

The present invention further refers to a system of supply cartridges comprising at least two types of supply cartridges (1, 1'), as well as to a process for preparing beverages in a machine (10) for preparing beverages of the type of the present invention.

20 Claims, 5 Drawing Sheets (52) U.S. Cl.
CPC ....... *A47J 31/3657* (2013.01); *A47J 31/3676* (2013.01); *A47J 31/3661* (2013.01)

(58) Field of Classification Search
USPC ...... 99/289 T, 289 R; 426/433, 432; 221/72, 221/74
See application file for complete search history.

(56) References Cited

U.S. PATENT DOCUMENTS

| | | | | |
|---|---|---|---|---|
| 4,175,675 A | * | 11/1979 | Maisonneuve | B65D 5/38 221/72 |
| 5,400,699 A | * | 3/1995 | Cailbault | A47J 37/1228 221/150 A |
| 5,555,790 A | * | 9/1996 | Ackermann | A47J 31/3657 426/77 |
| 2007/0114237 A1 | * | 5/2007 | Pirottavio | B65D 83/0472 221/25 |
| 2008/0190952 A1 | * | 8/2008 | Strub | B65D 5/721 221/2 |

FOREIGN PATENT DOCUMENTS

| | | |
|---|---|---|
| WO | 93/20737 A2 | 10/1993 |
| WO | 97/17006 A1 | 5/1997 |
| WO | 2007/003182 A1 | 1/2007 |
| WO | 2013/169134 A2 | 11/2013 |
| WO | 2014/109660 A1 | 7/2014 |

* cited by examiner

SUPPLY CARTRIDGE, SYSTEM OF SUPPLY CARTRIDGES AND PROCESS OF OPERATION OF A MACHINE USING SAID SYSTEM OF SUPPLY CARTRIDGES

CROSS REFERENCE TO RELATED APPLICATIONS

This application is a National Stage of International Application No. PCT/PT2016/050003 filed Feb. 11, 2016, claiming priority based on Portuguese Patent Application No. 108207, filed Feb. 11, 2015, the contents of all of which are incorporated herein by reference in their entirety.

FIELD OF THE INVENTION

The present invention refers to the field of supply cartridges adapted for supplying a support of single portions presenting a plurality of single dose portions of an edible substance, such as for example roasted and ground coffee, to an apparatus for preparing edible products, such as for example aromatic beverages.

The present invention further refers to a system of supply cartridges of the type of the present invention, as well as to a process for preparing beverages based upon a supply cartridge of the type of the present invention.

BACKGROUND OF THE INVENTION

The prior art includes several solutions relating with a package for a flexible and elongated support presenting a plurality of single dose portions, notably of coffee.

Documents U.S. Pat. Nos. 3,143,954 and 3,213,777 disclose beverage preparation machines that present an actuation device adapted for moving a strip with a plurality of single doses successively up to an extraction device.

Document WO97/17006 discloses another machine of this type and adapted for using a strip with single doses that is housed in a zigzag disposition along a vertical direction inside a respective package.

Document WO 2007/003182 A1 discloses a supply cartridge in box form and presenting a weakening line extending around the entire perimeter of a respective package.

Documents GB 2266228 and WO 2013/169134 A2, the latter filed by the applicant of the present invention, disclose machines adapted so that can operate with cartridges for supplying of single portions in cylinder and parallelepiped form. In particular, document GB 2266228 proposes package boxes that present a package opening adapted for the exit of respective support of single portions. Said exit opening is provided in only one face of the package box and provides two opposing elements that operate with double flag window upon the support of single portions. This configuration tends to apply two opposing forces upon the support of single portions and demonstrated as less efficient under tests.

None of the documents in the prior art disclose a solution for the exit opening of said package, in particular a solution for the exit opening that provides the efficient and reliable displacement of respective support of single portions out of said package.

Moreover, none of the documents in prior art discloses a system of cartridges with dimensions enabling the use thereof by the same machine and providing a more reliable and more ergonomic use.

GENERAL DESCRIPTION OF THE INVENTION

The objective of the present invention is to provide a supply cartridge comprising a package casing adapted for housing a support of single portions, provided in an elongated flexible support of strip-type, or similar, and adapted so that provides the efficient and reliable displacement of the respective support of single portions out of said package casing.

Said supply cartridge is preferentially used in a machine for preparing beverages, such as for example espresso type coffee, tea and similar, notably by means of extraction of aromatic substances packaged in said single dose portions.

This objective is solved according to the present invention by means of a supply cartridge according to claim 1.

In particular, the supply cartridge according to the present invention comprises a package casing in a generally parallelepiped-like form and adapted to house a support of single portions configured as a strip, whereby said package casing presents a weakened material line adapted so that can be manually ruptured and configured in a U-like form, or similar, so that maintains a pivoting-like connection to the remanding package casing and thereby exerts a force, preferentially downwards, upon the support of single portions as the latter is pulled out of said package casing.

According to a preferred embodiment, said package casing presents a width comprised between 40 and 60 mm, preferentially between 45 and 55 mm, a depth comprised between 10 and 70 cm, preferentially between 20 and 50 cm, and a height comprised between 4 and 50 cm.

According to another preferred embodiment, said package casing is provided in a cardboard with a density between 100 and 300 g, preferentially between 150 and 250 g.

Another objective of the present invention is to provide a system of supply cartridges comprising at least two types of supply cartridges adapted for different quantities of single portions and providing a more reliable and ergonomic use thereof.

This objective is solved according to the present invention by means of a system of supply cartridges according to claim 8.

Another objective of the present invention is to provide a process for preparing beverages based upon a supply cartridge of multiple single portions of the type of the present invention, and that results more reliable.

This objective is solved according to the present invention by means of a process according to claim 14.

According to a preferred embodiment, each cycle of preparing a beverage includes the repetition of the steps of rotating of an actuation device so as to correspond to the advance of the support of single portions by one position out of the package casing and to the supply of a single dose portion to an extraction device, for each operation cycle.

DESCRIPTION OF THE FIGURES

The invention shall now be explained in greater detail based upon preferred embodiments thereof and the Figures attached.

The Figures show, in simplified schematic representations.

DESCRIPTION OF PREFERRED EMBODIMENTS OF THE INVENTION

As aforementioned, there are known in prior art several solutions of supply cartridges (1) adapted for use in a machine (10) for preparing beverages, and basically comprising a package casing (11) adapted so as to house a strip-like, or similar, support (2) of single portions inside thereof, that presents a plurality of single dose portions (22) provided successively along a respective support extension (E).

Figure 1:
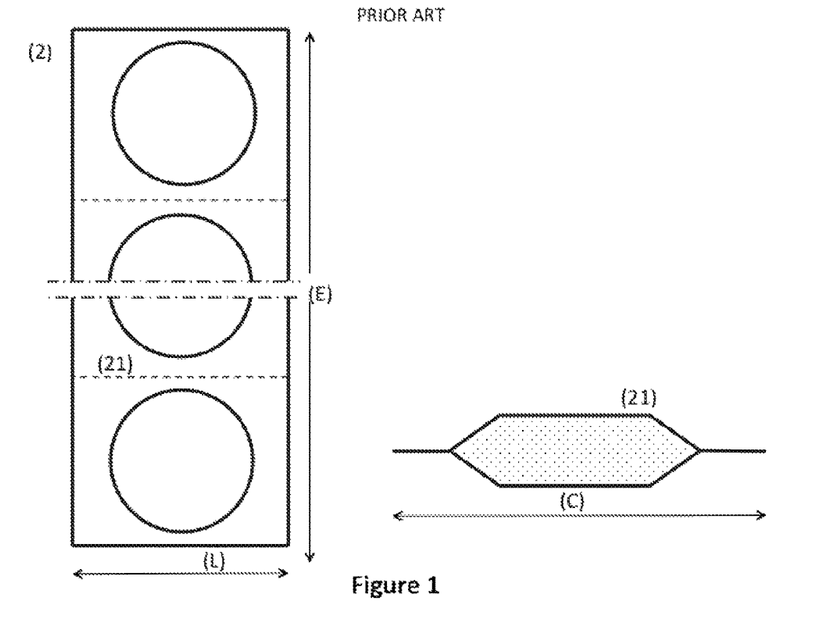
FIG. 1: top view of a support (2) of single portions (on the left-side) and side view of a single dose portion (21) (on the right-side) according to prior art.

FIG. 1 represents views of a support (2) of single portions according to the prior art, whereby said single dose portions (21) present a length (C) along the direction of said support extension (E), and a width (L) along a cross direction thereto.

Figure 2:
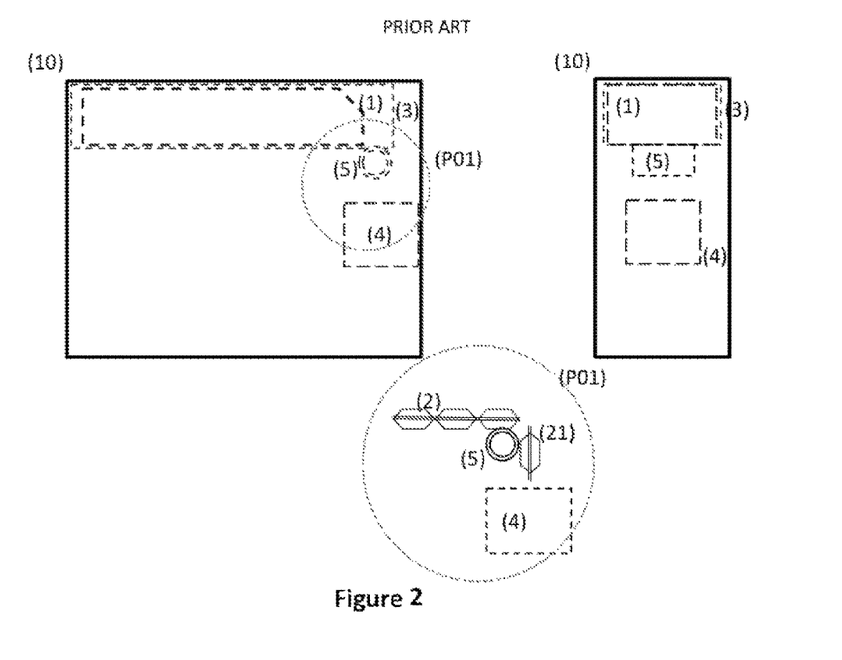
FIG. 2: side view (on the top, left-side) and front view (on the top, right-side), as well as detail P01 (on the bottom), of a machine (10) for preparing beverages according to prior art, adapted for using a supply cartridge (1) that includes a support (2) of single portions according to FIG. 1.

FIG. 2 represents a machine (10) for preparing beverages according to the prior art, adapted so as to use a supply cartridge (1) that comprises a support (2) of single portions of the type represented in FIG. 1. As one can observe, said machine (10) presents at least one collection disposition (3) adapted to fixate said supply cartridge (1), at least one extraction device (4) adapted so as to collect one said single dose portion (21) inside thereof, and at least one actuation device (5) disposed downstream of said supply cartridge (1) and upstream of said extraction device (4) and provided so that can move said support (2) of single portions by means of rotation and thereby supply respective single dose portions (21) successively to said extraction device (4).

In particular, as one can better observe in detail P01 of FIG. 2, said actuation device (5) is adapted so that can rotate and thereby exert a traction force upon a downstream edge of said support (2) of single portions, thereby moving the furthest downstream single dose portion (21) from a substantially horizontal displacement direction to a substantially vertical displacement direction, down to a position where it is separated from the remanding support (2) of single portions and falls under the action of the gravity force, inside of said extraction device (4).

Figure 3:
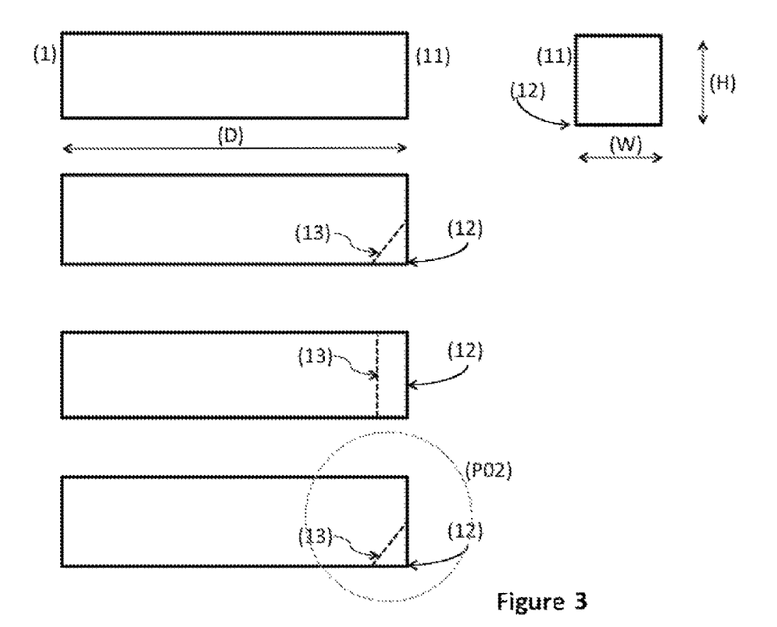
FIG. 3: side views of the different side faces (left-side) and front side (right-side) of a supply cartridge (1) according to the invention.

FIG. 3 discloses the different side views of a first embodiment of a supply cartridge (1) according to the present invention.

As one can observe, said supply cartridge (1) presents a package casing (11) provided in a general parallelepiped-like form, or similar, adapted so that can house said support (2) of single portions inside thereof. Moreover, said package casing (11) presents a width (W), a depth (D) and a height (H), whereby said depth (D) is provided substantially bigger than said width (W).

Said package casing (11) further presents a weakening line (13) adapted so that can be manually ruptured and provided in a package corner (12) in the proximity of which there is disposed a downstream edge (22) of said support (2) of single portions (not represented).

Said weakening line (13) can be provided by only a line of successive regions of weakened package material, in a general perforated-line pattern or similar, or by two or more weakening lines (13) developing in parallel, or by another form of weakening configuring an orientation of weakening.

In particular, according to a first inventive aspect of the present invention, said weakening line (13) is provided with a configuration in a U-like form, or similar, preferentially developing in at least two faces of said package corner (12), so that provides a pivoting-like connection of the respective package corner (12) upon the respective exit opening of said support (2) of single portions. It thus advantageously results an opening arrangement whereby part of the package corner (12) remains in connection with the remanding package casing (11) in form of a pivoting window and so that exerts a pressure upon the support (2) of single portions, that way favoring the displacement thereof out of said supply cartridge (1).

As one can observe, according to a preferred embodiment, said weakening line (13) is provided in the side faces and in the downward face of said package corner (12), so that configures an exit opening in a trapezoid prism form.

Figure 4:
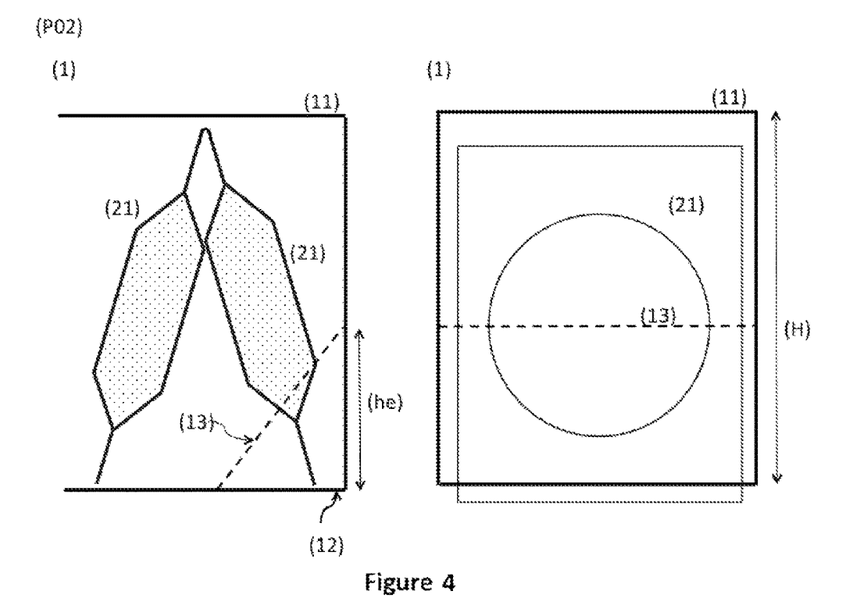
FIG. 4: cut view of the detail (P02) according to FIG. 4 (left-side) and corresponding front view of the first embodiment of the supply cartridge (1) according to the invention.

FIG. 4 represents the detail P02 identified in FIG. 3.

According to a preferred embodiment of a supply cartridge (1), said weakening line (13) develops along said height (H) of the package casing (11), so that provides a height of opening exit that is bigger than half and smaller than ¾ of said length (C) of each single dose portion (21), preferentially smaller than ⅔ of said length (C). The resulting disposition of exit opening favors the exit of said support (2) of single portions, exerting pressure upon the latter while simultaneously providing free space for the passage of said single dose portions (21).

According to another preferred embodiment of the supply cartridge (1), said weakening line (13) develops along said depth (D) of the package casing (11), so that provides an exit extension smaller than said length (C) of each single dose portion (21), preferentially smaller than ¾ of said length (C), particularly preferentially smaller than ⅔ of said length (C).

Figure 5:
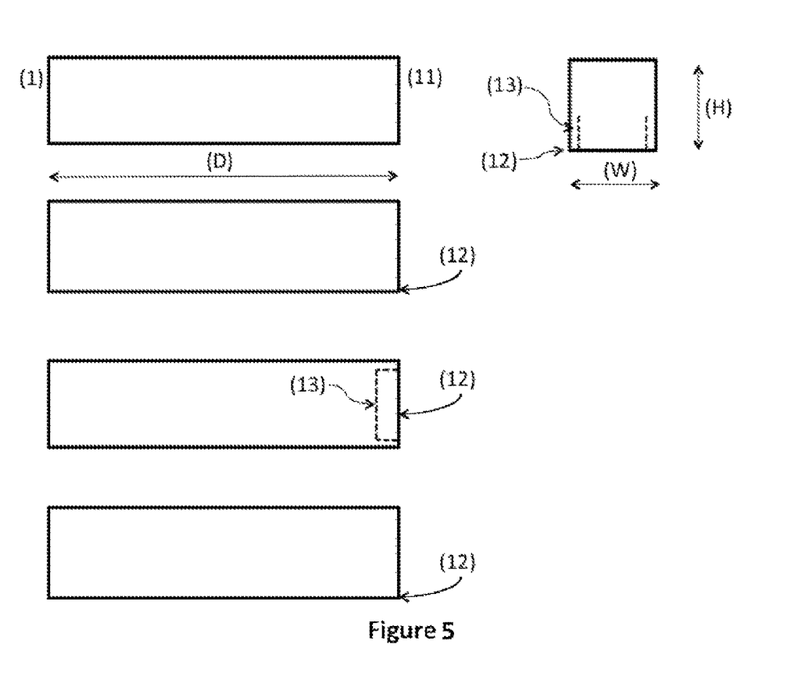
FIG. 5: main side views of a second embodiment of a supply cartridge (1) according to the invention.

FIG. 5 represents a second embodiment of the weakening line (13) in a supply cartridge (1) according to the present invention.

As one can observe, the package casing (11) in this case still presents a weakening line (13) configured in a U-like form and provided only on the side and downward faces of the package corner (12). From the rupture of the weakening line (13) there thus results an exit opening that provides a structural reinforcement of the side regions and that advantageously contributes to keeping a stable alignment of the support (2) of single portions as the latter is pulled out of the cartridge casing (11).

Figure 6:
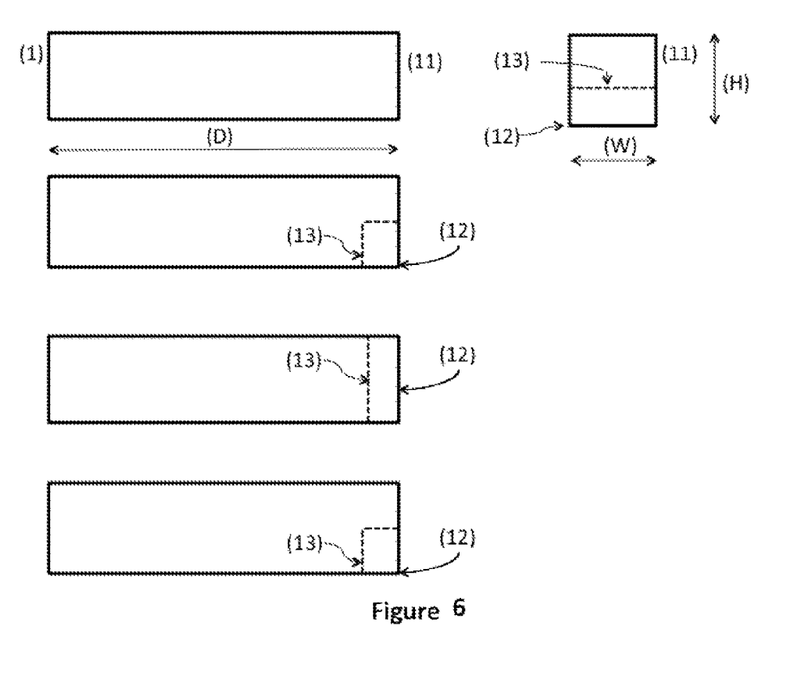
FIG. 6: main side views of a third embodiment of a supply cartridge (1) according to the invention.

FIG. 6 represents a third of the weakening line (13) in a supply cartridge (1) according to the present invention.

In this case, the package casing (11) presents a weakening line (13) provided with a closed perimeter configuration and developing in the side faces, in the front face and in the downward face. The rupture of the weakening line (13) thus provides an opening of completely unobstructed are for the exit of said support (2) of single portions.

Figure 7:
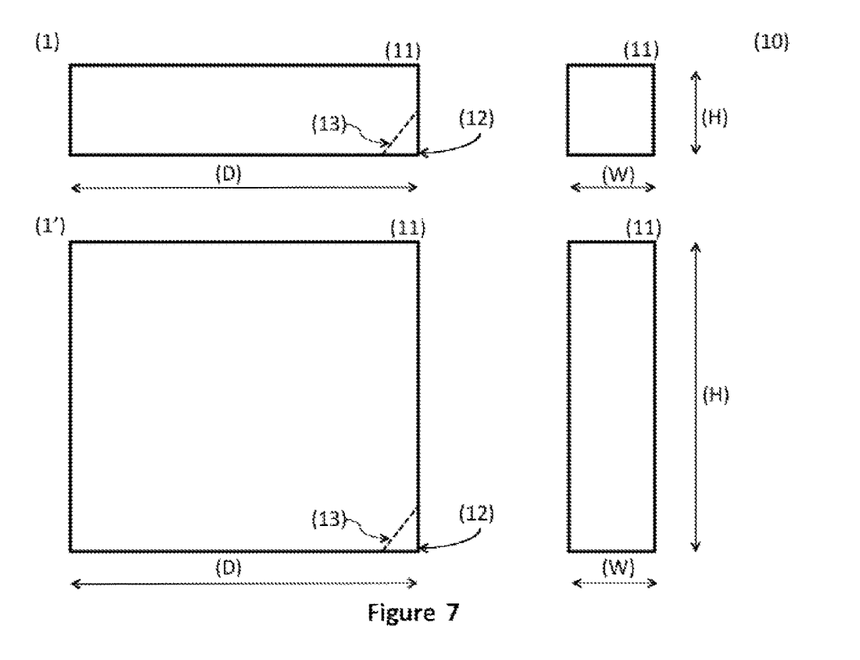
FIG. 7: side view (left-side) and front side (right-side), of two types of supply cartridge (1, 1') of a first embodiment of a system of supply cartridges (1) according to the invention.

FIG. 7 represents a first embodiment of a system of supply cartridges (10) according to the present invention, comprising a first supply cartridge (1) of smaller height (H)—represented in side and front view in the top part of the figure—and a second supply cartridge (1') of greater height (H)—represented in the bottom part of the figure.

According to a first inventive aspect, said supply cartridges (1, 1') present cartridge casings (11) that preset a similar weakening line (13) and distinguish among themselves by the different height (H).

Figure 8:
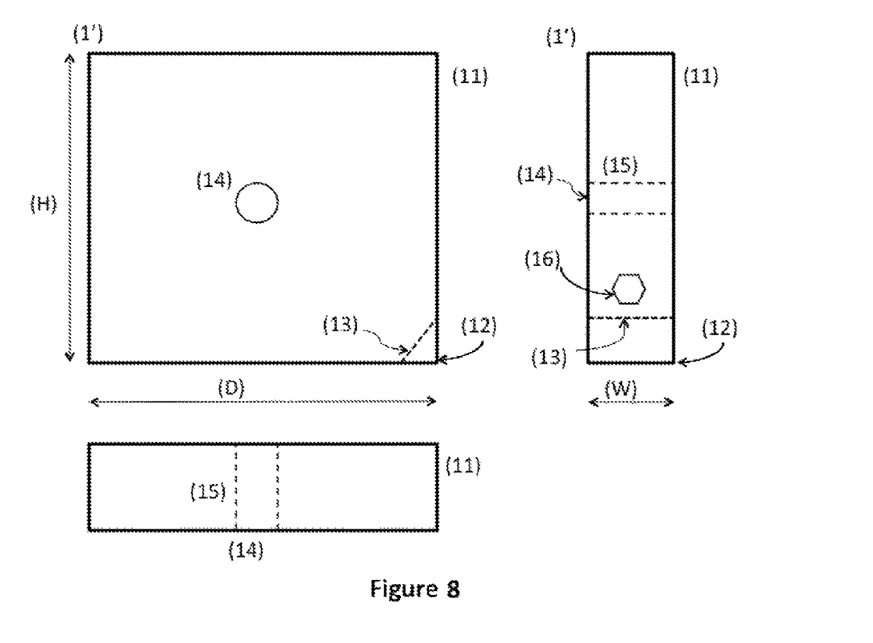
FIG. 8: side view (left-side) and front view (right-side) of an embodiment of supply cartridge (1') according to the invention.

FIG. 8 represents another embodiment, whereby the supply cartridge (1) in this case presents a hole (14) in the side faces of the respective cartridge casing (11), adapted so as to fixate a cylinder (15) so that can rotate and around which there is rolled said support (2) of single portions.

According to a preferred embodiment, said cylinder (15) is supported by respective support elements provided in said collection disposition (3).

Moreover, according to another preferred embodiment, the cartridge casing (11) of said supply cartridges (1, 1') present identification means (16), preferentially a device of the RFID type or similar, preferentially disposed in the region above of said exit opening of the support (2) of single portions.

Figure 9:
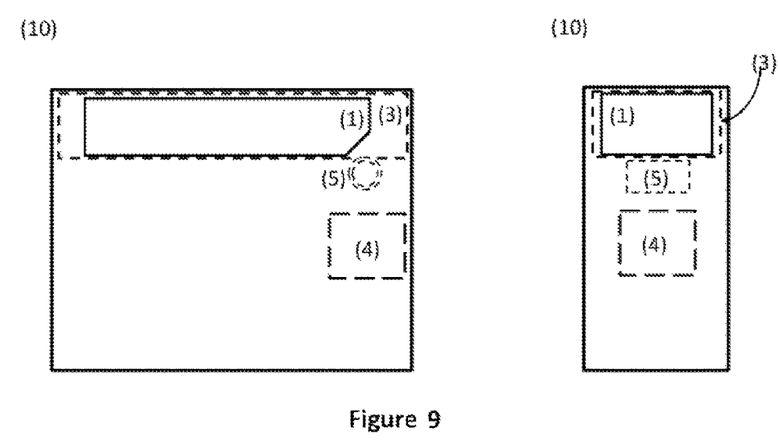
FIG. 9: Side and front views (right-side) of a machine (10) for preparing beverages adapted for using a system of supply cartridges according to the present invention, presenting a first embodiment of a supply cartridge (1) according to the present invention and of said system of supply cartridges.
Figure 10:
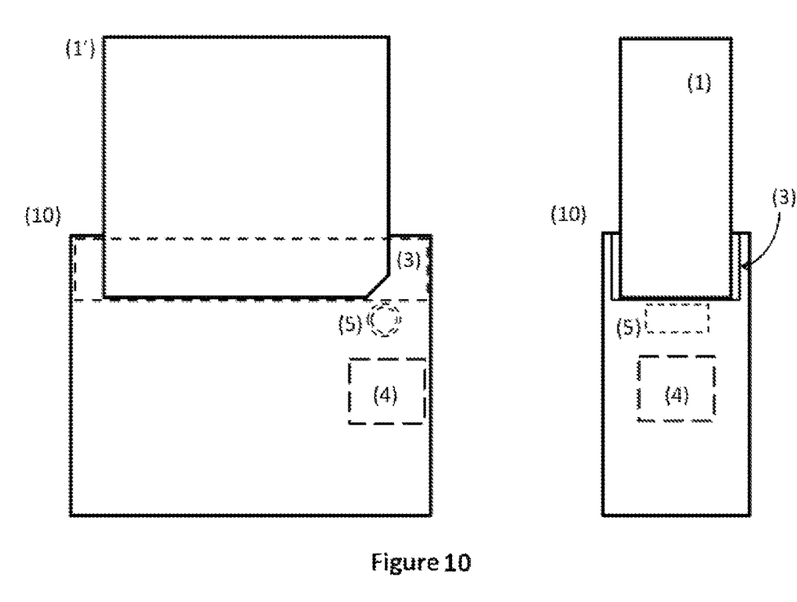
FIG. 10: side and front views (right-side) of a machine (10) for preparing beverages and adapted for using a system of supply cartridges according to the present invention, presenting a second embodiment of a supply cartridge (1') according to the present invention and of said system of supply cartridges.

FIGS. 9 and 10 represent a machine (10) for preparing beverages adapted for using a system of supply cartridges (1, 1') according to the present invention. As one can observe, the same machine (10) for preparing beverages presents a collection disposition (3) adapted so that provides the placement in position both of a first supply cartridge (1) presenting a height (H), and of a second supply cartridge (1') presenting a different, in particular a substantially bigger, height (H).

According to a preferred embodiment, said collection disposition (3) is provided with a bigger depth than the depth (D) of said supply cartridges (1, 1'). Moreover, according to a preferred embodiment, said collection disposition (3) presents a lid-like element that can be removed in the case of using a supply cartridge (1') of bigger height (H) than the height of the disposition collection (3).

A process for preparing beverages according to the present invention comprises the steps of providing a machine (10) for preparing beverages, in particular a machine (10) for preparing beverages that presents an actuation device (5) provided so that can rotate around a substantially horizontal rotation axis and disposed upstream of an extraction device (4), and of providing a supply cartridge (1) comprising a cartridge casing (11) that packages a support (2) of single portions in a strip-like form, or similar, presenting a plurality of successive single dose portions (21), and a cartridge corner (12) presenting a weakening line (13).

Thereafter, the process includes the steps (not necessarily in this sequence) of manually rupturing said weakening line (13) provided in said cartridge corner (12) and of fixating the cartridge casing (11) in a collection disposition (3) provided in said machine (10), whereby said cartridge casing (11) is disposed with a respective cartridge corner (12) in the proximity of said actuation device (5).

Thereafter, the process includes the steps of placing a first single dose portion (21) that is furthest downstream in said support (21) of single portions in engagement with an exterior perimeter surface of said actuation device (5), and actuating said actuation device (5) in a rotation movement so as to displace said support (21) of single portions by means of traction out of the cartridge casing (11).

The invention claimed is:

1. A supply cartridge (1) adapted for supplying a support (2) of single portions, that presents a plurality of single dose portions (21) adapted so as to contain an edible substance, such as for example roast and ground coffee, to a machine (10) for preparing edible products, such as aromatic beverages, comprising:
   a package casing (11) provided in a general parallelepiped form, or similar, having a width (W), a depth (D) and a height (H), and having a package corner (12), and
   a support (2) of single portions provided in a strip form, or similar, and comprising a plurality of single dose portions (21) that have a length (C) and a width (L) and are disposed successively in an adjacent manner along a support extension (E),
   whereby said support (2) of single portions is provided inside of said package casing (11) with a downstream edge (22) in the proximity of said package corner (12), and
   whereby a region of said package corner (12) has at least one weakening line (13) of said package casing (11) adapted so that said package casing (11) can be manually ruptured and thereby provided with an exit opening for an exit of said support (2) of single portions out of said package casing (11),
   wherein said weakening line (13) is provided with a semicircular or semi-trapezoidal configuration, or similar, upwards oriented, so that a pivoting connection is provided for the respective package corner (12) upon said exit opening, thereby exerting a weight upon said support (2) of single portions with a force component opposite to a traction force exerted upon said support (2) of single portions as the support (2) of single portions is pulled out of said package casing (11).

2. The supply cartridge (1) according to claim 1, wherein said weakening line (13) is in two or three faces of said package corner (12).

3. The supply cartridge (1) according to claim 1, wherein said weakening line (13) is in side faces and in a downwards oriented face of said package corner (12), or in a front face and the downwards oriented face of said package corner (12).

4. The supply cartridge (1) according to claim 1, wherein said weakening line (13) is in a front face and in a downwards oriented face of said package corner (12) thereby providing a width of the exit opening smaller than the width (W) of said package casing (11) and bigger than the width (L) of said support (2) of single portions.

5. The supply cartridge (1) according to claim 1, wherein said weakening line (13) is along a direction of the height (H) of said package casing (11), thereby providing a height of the exit opening bigger than half and smaller than ¾ of said length (C) of each single dose portion (21).

6. The supply cartridge (1) according to claim 1, wherein said weakening line (13) is along a direction of said depth (D), so as to provide an extension of the exit opening smaller than said length (C) of each single dose portion (21).

7. The supply cartridge (1) according to claim 1, wherein a hole (14) is formed in side faces of said package casing (11), and provides rotation support for a cylinder (15) around which said support (2) of single portions is rolled.

8. A system of supply cartridges comprising:
at least two types of supply cartridges, each adapted for housing a support (2) of single portions in strip form, or similar, in particular two types of supply cartridges (1, 1') according to claim 1,
wherein said at least two types of supply cartridges differ by comprising a package casing (11) having a similar weakening line (13) and at least one different dimension.

9. The system according to claim 8, wherein said at least two types of supply cartridges (1, 1') differ by presenting supports (2) of single portions with a different number of single dose portions (21).

10. The system according to claim 8, wherein said at least two types of supply cartridges (1, 1') differ by presenting a similar depth (D) and a different height (H).

11. The system according to claim 8, wherein said at least two types of supply cartridges (1, 1') differ by presenting a different depth (D) and a similar height (H).

12. The system according to claim 8, wherein said at least two types of supply cartridges (1, 1') differ by presenting a similar format and only one different dimension.

13. The system according to claim 8, wherein each said types of supply cartridges (1, 1') presents identification means (16), whereby said information means (16) is provided in a front face and in a similar relative position of the package casing (11) of said supply cartridges (1, 1'), in relation to a front region of a machine (10) for preparing beverages.

14. The supply cartridge (1) according to claim 1, wherein said weakening line (13) is provided with a U-shaped form.

15. The supply cartridge (1) according to claim 5, wherein the height of the exit opening is smaller than ⅔ of said length (C).

16. The supply cartridge (1) according to claim 6, wherein said extension of the exit opening smaller than said length (C) of each single dose portion (21) is smaller than ¾ of said length (C), preferentially smaller than ⅔ of said length (C).

17. The system according to claim 12, wherein said only one different dimension comprises a similar width (W) and depth (D) and a different height (H).

18. The system according to claim 13, wherein said identification means (16) is of RFID type.

19. A process for preparing an edible product, such as for example an aromatic beverage, comprising the steps:
providing a machine (10) for preparing edible products, in particular a machine (10) for preparing beverages that presents an extraction device (4) adapted for collecting a single dose portion (21), and an actuation device (5) that can rotate around a substantially horizontal rotation axis and disposed upstream of an extraction device (4);
providing a supply cartridge (1) having a package casing (11) that houses a support (2) of single portions in strip form, or similar, presenting a plurality of successive single dose portions (21), and a package corner (12) having a weakening line (13);
manually rupturing said weakening line (13) provided in said package corner (12) so that the package corner results in pivoting connection with the remanding package casing (11);
fixing said package casing (11) in a collection disposition (3) provided in said machine (10), whereby said package casing (11) is disposed with a respective package corner (12) in the proximity of said actuation device (5);
placing a first single dose portion (21) that is furthest downstream in said support (21) of single portions in interaction with an exterior perimeter surface of said actuation device (5), and
driving said actuation device (5) in a rotation movement so that the actuation device displaces said support (21) of single portions by means of traction out of the package casing (11), at least partially against an opposing force component exerted downwards by said package corner (12).

20. The process according to claim 19 characterized in that further includes the steps:
introducing a cylinder (15) in a hole (14) provided in the side faces of said package casing (11), so that the edges (15) of said cylinder project outside of said side faces; and
placing the projecting edges of said cylinder (15) in said support so that said support can rotate in a part of said machine (10).

* * * * *